(12) United States Patent
Scribner

(10) Patent No.: US 7,146,904 B2
(45) Date of Patent: Dec. 12, 2006

(54) TOP LOAD COFFEE MAKER WITH FRONT ACCESS WATER RESERVOIR

(75) Inventor: Paul Scribner, Walkerton, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 287 days.

(21) Appl. No.: 10/752,132

(22) Filed: Jan. 6, 2004

(65) Prior Publication Data

US 2005/0145112 A1  Jul. 7, 2005

(51) Int. Cl.
*A47J 31/00* (2006.01)
(52) U.S. Cl. .............................. 99/300; 99/306; 99/307
(58) Field of Classification Search ................ 99/300, 99/302 R, 304, 306, 307; 220/252, 254, 220/255, 259, 822, 817, 819, 826, 810
See application file for complete search history.

(56) References Cited

U.S. PATENT DOCUMENTS

| 3,877,600 | A | * | 4/1975 | Beil ........................... 220/826 |
| 4,558,640 | A | * | 12/1985 | Marchant ..................... 99/307 |
| 5,687,636 | A | * | 11/1997 | Diore et al. .................. 99/285 |
| 6,279,458 | B1 | * | 8/2001 | Sham et al. .................. 99/281 |

* cited by examiner

*Primary Examiner*—Reginald Alexander
(74) *Attorney, Agent, or Firm*—Clifton G. Green; Robert O. Rice; John F. Colligan

(57) ABSTRACT

A top-loading coffeemaker comprises a housing having an open top and two covers pivotable between opened and closed positions. A filter basket can be inserted through a front portion of the open top to be supported above a carafe. A reservoir is located in a rear portion of the top-loading coffeemaker. A conduit extends from an inlet at the front portion of the top-loading coffeemaker to the reservoir. Water poured into the inlet flows through the conduit to the reservoir. A linkage connecting the two covers causes the rear cover to be opened when the front cover is opened, and enables the rear cover to be opened alone.

24 Claims, 10 Drawing Sheets

TOP LOAD COFFEE MAKER WITH FRONT ACCESS WATER RESERVOIR

BACKGROUND OF THE INVENTION

1. Field of the Invention

The invention relates to automatic drip coffeemakers, and in particular to a top-loading automatic drip coffeemaker having a front-located filter basket and a rear-located water reservoir, and a water inlet adjacent the filter basket for filling a water reservoir from the front of the coffeemaker.

2. Description of the Related Art

Conventional home coffeemakers are well known, and typically have several operational elements in common, such as a housing enclosing a water reservoir and having a receptacle for receiving a container to hold the coffee beverage, a heating element for heating water, a hotplate for keeping the coffee beverage warm, a showerhead for distributing water over the ground coffee, and a filter basket above the container for holding the ground coffee during the brewing process. The water reservoir is typically located to the rear of the coffeemaker. The container and filter basket are typically located at the front of the coffeemaker.

Notwithstanding the inclusion of several common elements in most coffeemakers, the relative position of these elements can assume several different configurations. For example, some coffeemakers have a slide-in filter basket in combination with an inlet at the front into which water can be poured to fill the reservoir with brewing water. The inlet may have a cover which can be moved from an opened to a closed position over the inlet. The remainder of the top of the coffeemaker will be typically closed. The filter basket will typically be inserted above the container and beneath the inlet and showerhead by sliding the filter basket horizontally from the front into a suitable support structure. This configuration tends to have a long or deep profile because of the filter basket handle extending from the front of the coffeemaker. It is also disadvantageous in that the filter basket must be removed to replace the filter. Furthermore, the coffeemaker must be provided with an enclosure that is independent of the water reservoir enclosure, which must incorporate a separate cover mechanism.

In another configuration, the filter basket is supported in the coffeemaker by dropping the filter basket through an opening in the housing to be suspended above the container. The opening is enclosed by a pivotable cover. Because of the filter basket support, water is introduced into the reservoir by pouring the water directly into the reservoir located behind the filter basket at the rear of the coffeemaker. Thus, it is necessary to reach over the filter basket to pour water into the reservoir. If the coffeemaker is stored beneath a cabinet, it may be necessary to move the coffeemaker away from the overhanging cabinet in order to fill the reservoir.

SUMMARY OF THE INVENTION

A top-loading automatic drip coffeemaker for brewing a coffee beverage from ground coffee comprises a housing having a rear portion and a front portion, a water reservoir located in the rear portion for storing water for brewing the coffee beverage, a filter basket located in the front portion for containing the ground coffee during brewing, and a conduit extending between the front and rear portions, with an inlet located in the front portion and an outlet fluidly connected to the water reservoir, such that the water reservoir can be filled by introducing water into the inlet. A portion of the conduit can be located in front of the filter basket, or can extend beside the filter basket.

A portion of the inlet can be located in front of the filter basket. The conduit can be an open top channel.

The top-loading automatic drip coffeemaker can further comprise a rear cover moveably mounted to the housing for movement between a closed position, where the rear cover overlies the water reservoir, and an open position, where the rear cover is away from the water reservoir to permit access thereto. The top-loading automatic drip coffeemaker can further comprise a front cover moveably mounted to the housing for movement between a closed position, where the front cover overlies the filter basket, and an open position, where the front cover is away from the filter basket to permit the insertion and removal of a filter into and from the filter basket. A linkage can connect the front and rear covers such that the rear cover is moved from the closed to the open position in response to the movement of the front cover from the closed to the open position.

The linkage can connect the front and rear covers such that the rear cover can be moved from the closed to the open position independent of the movement of the front cover. The linkage can comprise a linkage arm pivotally attached to the rear cover and translatable toward the front cover when the rear cover is moved from the closed position to the open position or a linkage arm slidably attached to the front cover and moveable independently of the front cover. The closing of the top cover can also result in automatic closing of the rear cover, which is preferably accomplished through gravity.

The top-loading automatic drip coffeemaker can further comprise a base located beneath the front portion for supporting a container containing the coffee beverage.

In an alternate embodiment, a top-loading automatic drip coffeemaker for brewing a coffee beverage from ground coffee comprises a housing having a rear portion and a front portion, a water reservoir located in the rear portion for storing water for brewing the coffee beverage, a filter basket located in the front portion for containing the ground coffee during brewing, a rear cover moveably mounted to the housing for movement between a closed position, where the rear cover overlies the water reservoir, and an open position, where the rear cover is away from the water reservoir to permit access thereto, a front cover moveably mounted to the housing for movement between a closed position, where the front cover overlies the filter basket, and an open position, where the front cover is away from the filter basket to permit the insertion and removal of a filter into and from the filter basket, and a linkage connecting the front and rear covers such that the rear cover is moved from the closed to the open position in response to the movement of the front cover from the closed to the open position.

In yet another embodiment, the invention relates to a top-loading automatic drip coffeemaker for brewing a coffee beverage from ground coffee. The top-loading automatic drip coffeemaker comprises a housing having an open top and comprising a rear portion and a front portion accessible through the open top. A water reservoir is located in the rear portion for storing water for brewing the coffee beverage. A filter basket is located in the front portion for containing the ground coffee during brewing. Front and rear covers are moveably mounted to the housing, with the front cover covering the filter basket and the rear cover covering the reservoir. The covers are movable between open and closed positions to provide access to the filter basket and reservoir, respectively. A linkage connects the front and rear covers such that the rear cover is moved from the closed to the open position in response to the movement of the front cover from the closed to the open position.

The linkage can connect the front and rear covers such that the rear cover can be moved from the closed to the open position independent of the movement of the front cover. Preferably, each of the front and rear covers are pivotally mounted to the housing. The linkage comprises a link arm having one end fixedly mounted to the rear cover, another end slidably mounted to the front cover, and a catch extending from the link arm such that when the front cover is pivoted from the closed to the open position, the catch contacts a portion of the front cover to move the rear cover to the open position.

Additionally, the front cover can comprise a front lever arm, the rear cover comprise a rear lever arm, and the link arm is rotatably pinned to the rear cover and slidably mounted to the front lever arm such that when the front cover is pivoted from the closed to the open position, the catch slides into contact with the front lever arm to move the rear cover to the open position, and when the rear cover is pivoted from the closed to the open position, the catch slides away from the front lever arm to leave the front cover in the closed position. The closing of the top cover can result in automatic closing of the rear cover, which is preferably accomplished through gravity.

DESCRIPTION OF AN EMBODIMENT OF THE INVENTION

Figure 1:
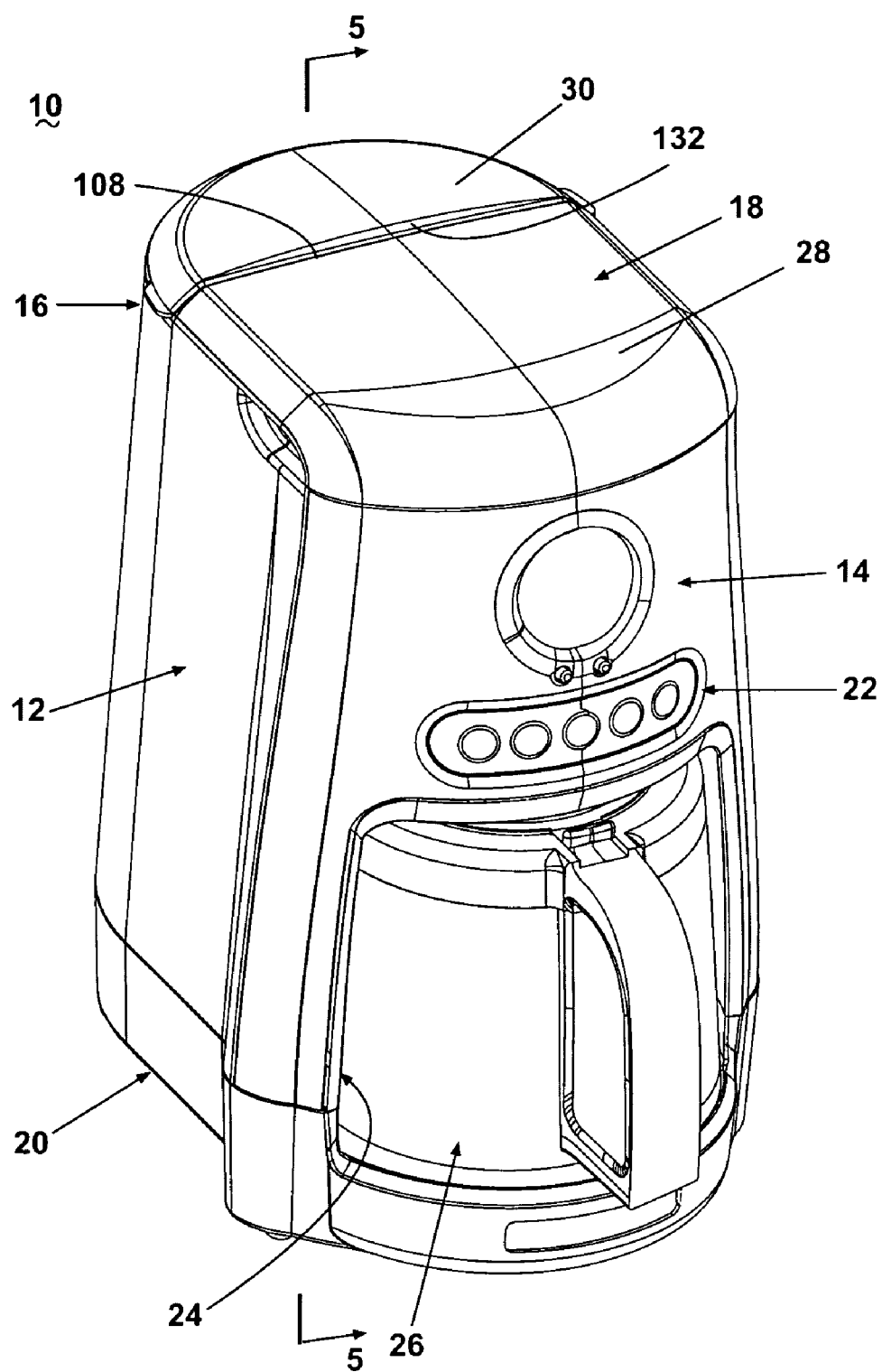
FIG. 1 is a perspective view of a top-loading automatic drip coffeemaker comprising a top load filter basket, a front fill reservoir, and a dual cover assembly according to the invention.

Referring now to the Figures and in particular to FIG. 1, a top-loading automatic drip coffeemaker 10 comprises a housing 12 comprising a front portion 14, a rear portion 16, a top portion 18, and a bottom portion 20. References herein to "front" or "proximal" in describing the elements of the top-loading automatic drip coffeemaker 10 refer to elements that face a user during the intended normal use of the coffeemaker 10, or to elements that are near or toward the user or the front of the coffeemaker 10. Thus, for example, the front portion 14 illustrated in FIG. 1 normally faces the user during operation of the top-loading automatic drip coffeemaker 10. Conversely, references herein to "rear" or "distal" refer to elements that face or are positioned away from the user. Additionally, the references herein to "top-loading" refer to the class of coffeemakers where the filter and/or the filter basket are lowered/inserted through the top of the coffeemaker. This is in contrast to the class of coffeemakers where the filter and/or filter basket is inserted laterally through the side of the coffeemaker. The top-loading automatic drip coffeemaker 10 described herein comprises several elements common to conventional coffeemakers, such as a hotplate, a water heating apparatus, and a stop valve preventing the flow of coffee to the carafe when the carafe is removed, which do not form a part of the invention, and will not be described except as necessary for an understanding of the invention.

The front portion 10 is provided with a control panel 22 for controlling the operation of the top-loading automatic drip coffeemaker 10, such as setting a brewing start time, selecting a brewing strength, setting a warming time, initiating the brewing cycle and the like. The front portion 10 is also provided with a receptacle 24 for receiving a carafe 26 during the brewing and warming processes. The top portion 18 comprises a front cover 28 and a rear cover 30, both hingedly attached to the housing 12 and in operable register with each other.

Figure 2:
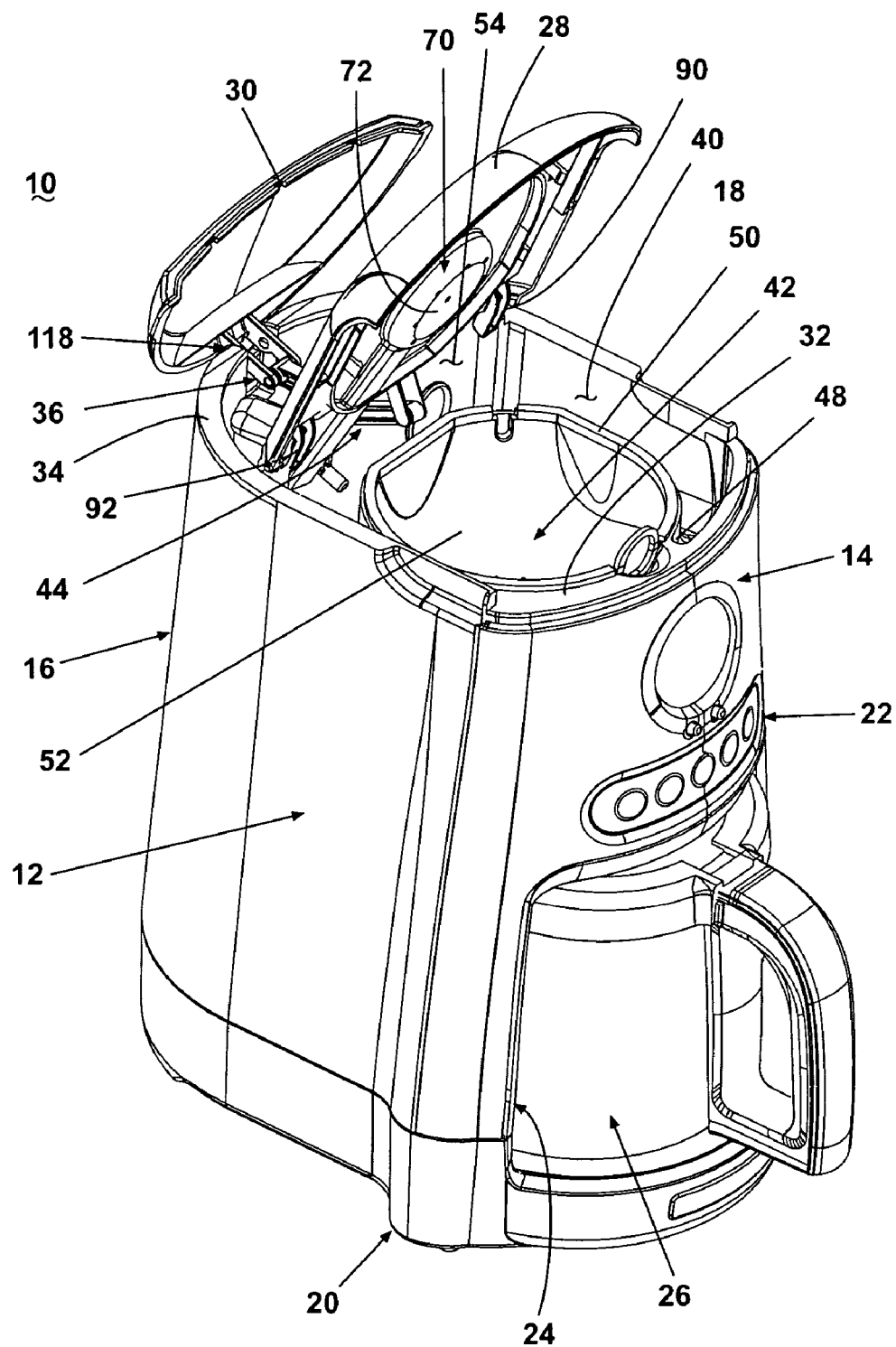
FIG. 2 is a perspective view of the top-loading automatic drip coffeemaker illustrated in FIG. 1 illustrating the dual cover assembly in an open position.

Referring also to FIG. 2, the top portion 18 also comprises a front wall 32 forming an upper portion of the front portion 14, and an arcuate wall 34 forming an upper portion of the rear portion 16 and transitioning to the front wall 32, both of which are adapted for operable register with the covers 28, 30. The front wall 32 and the arcuate wall 34 define a chamber 40 in the interior of the housing 12.

Figure 3:
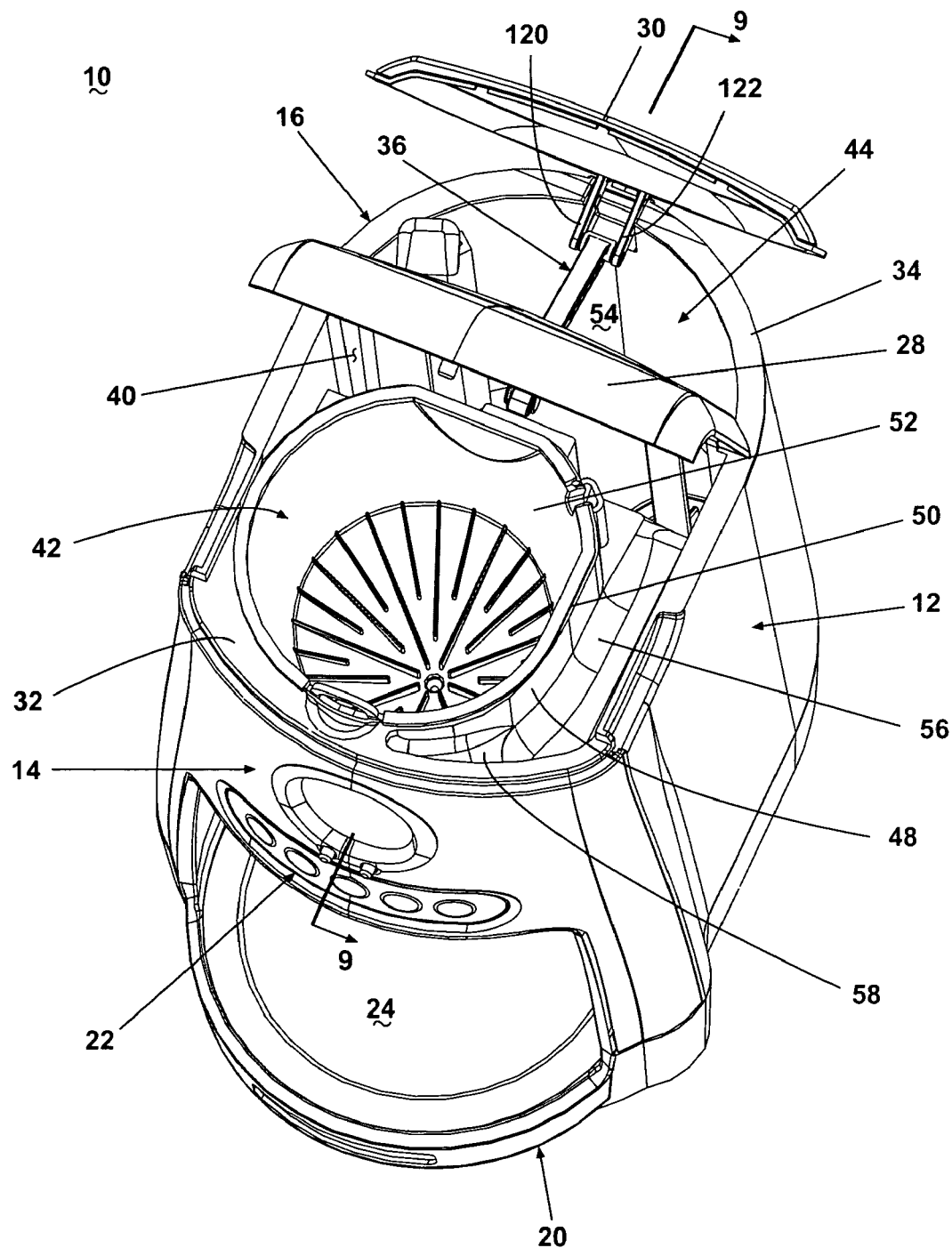
FIG. 3 is a perspective top view of the top-loading automatic drip coffeemaker illustrated in FIG. 2 illustrating the filter basket and the reservoir comprising the interior of the coffeemaker.
Figure 4:
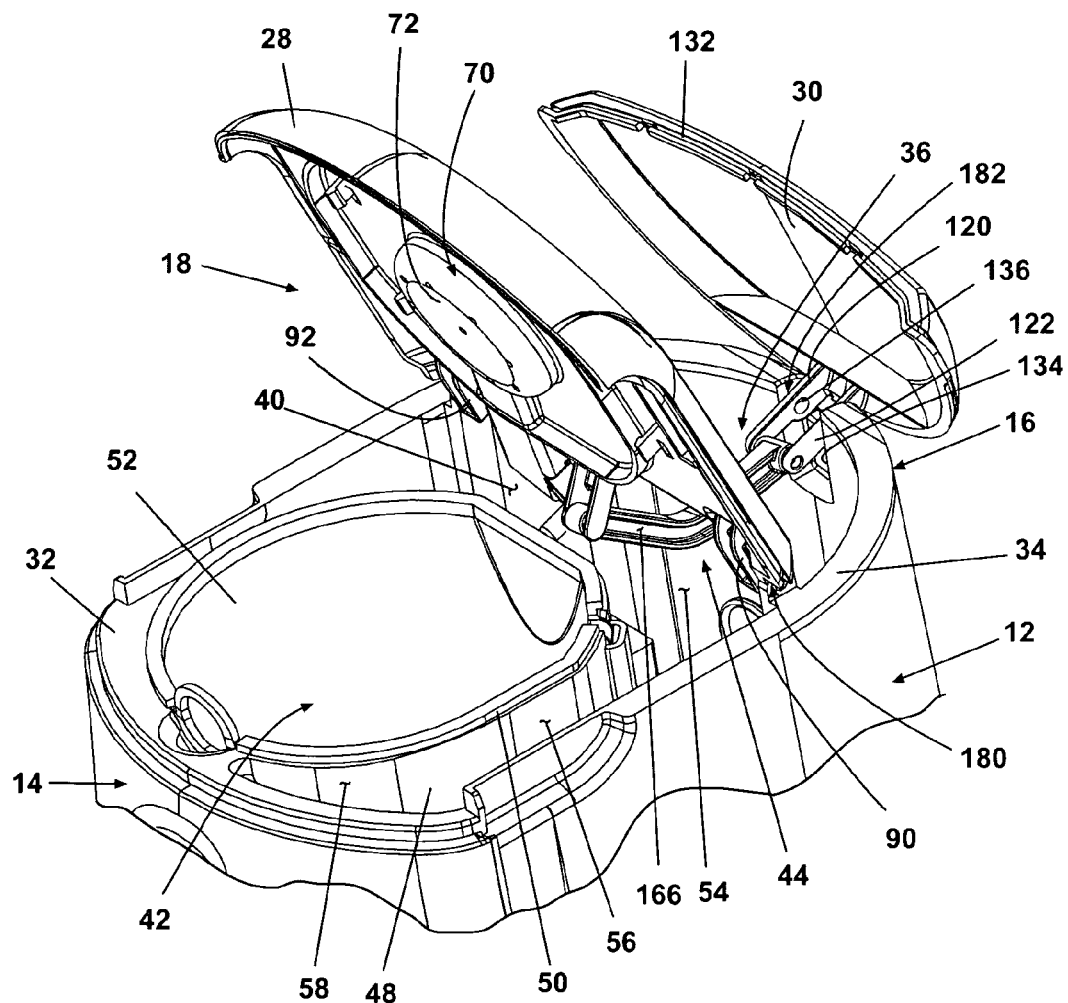
FIG. 4 is an enlarged perspective partial view of an upper portion of the top-loading automatic drip coffeemaker illustrated in FIG. 2 illustrating a linkage assembly comprising a portion of the dual cover assembly.

As shown also in FIG. 3, a linkage assembly 36 operably interconnects the front cover 28 and the rear cover 30 as hereinafter described.

Referring to FIGS. 2–5, the chamber 40 comprises a basket portion 42 located in a forward portion of the housing 12, and a reservoir portion 44 located in a rear portion of the housing 12. The basket portion 42 comprises an arcuate interior wall 48 spaced somewhat away from the front wall 32 and adapted with a basket support 50 for supporting a filter basket 52 above the carafe 26 for delivery of brewed coffee to the carafe 26. The reservoir portion 44 comprises a generally well-known reservoir 54 for holding water for the coffee brewing process, and connected in a well-known manner to a water heating assembly (not shown).

At the front portion 14 of the housing 12, a portion of the front wall 32, the arcuate wall 34, and the interior wall 48 define a conduit 56 extending from the front portion of the housing 12 to the rear portion of the housing 12. The conduit is fluidly connected to reservoir 54. As illustrated in FIG. 3, the conduit 56 comprises an open-top channel having a floor that slopes somewhat from the front portion 14 of the housing 12 to the reservoir 54. Intermediate the front wall 32 and the interior wall 48 the conduit 56 forms an inlet 58 which extends at least partially circumferentially around and to the front of the filter basket 52. The inlet 58, the conduit 56, and the reservoir 54 are adapted and fluidly interconnected so that water poured into the inlet 58 will flow through the conduit 56 and into the reservoir 54.

Alternatively, the conduit 56 can comprise a closed conduit having an open-top inlet adapted for the pouring of water therein. The inlet 58 can also be positioned further to the side of the filter basket 52, or the conduit 56 can completely circumscribe the filter basket 52 so that water can be poured into the top-loading automatic drip coffeemaker 10 at any point along the front and sides of the filter basket 52.

Figure 6A:
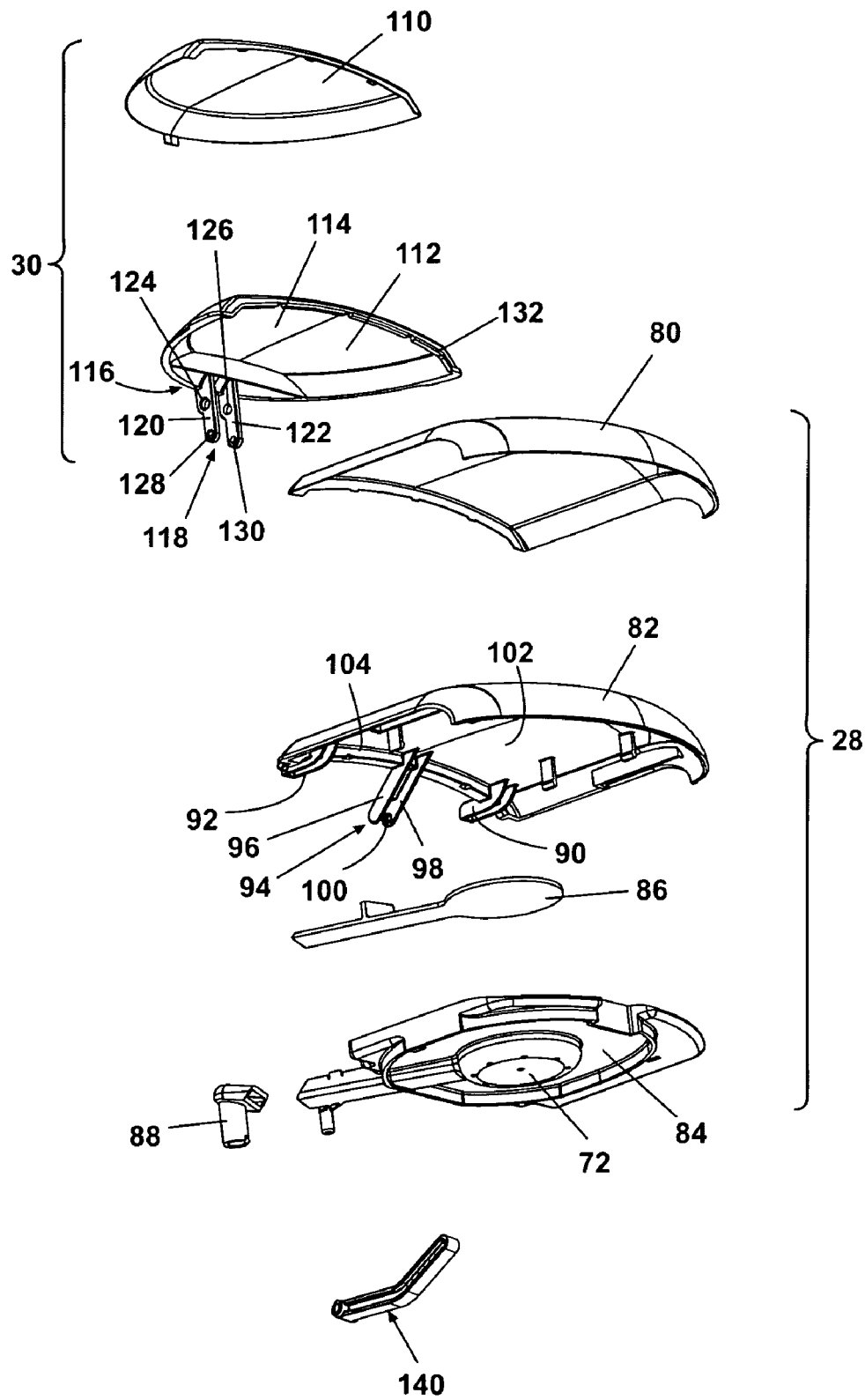
FIG. 6A is an exploded view from below of the dual cover assembly illustrated in FIG. 1.
Figure 6B:
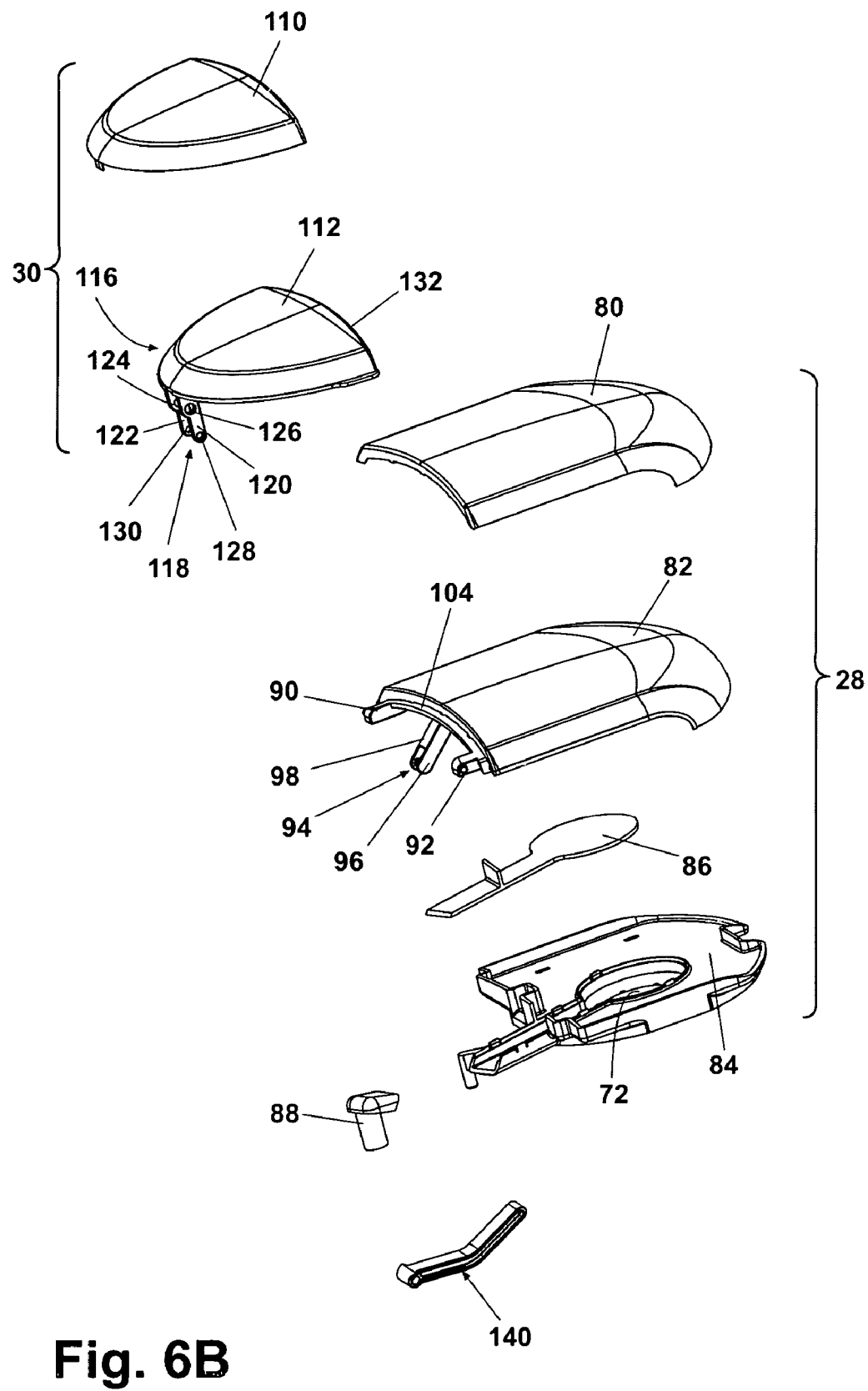
FIG. 6B is an exploded view from above of the dual cover assembly illustrated in FIG. 1.

Referring also to FIGS. 6A–B, the front cover 28 is illustrated as a multi-piece assembly comprising a top cap 80, an inner cap 82, and a bottom cap 84 in stacked, interconnected register. Along with a showerhead plate 86, the bottom cap 84 forms a showerhead 72 comprising a portion of a shower assembly 70 for delivering heated water to the filter basket 52. Alternatively, the front cover 28 can comprise a single cover piece, a pair of cover pieces, or another configuration, consistent with the inventive concepts described herein. The inner cap 82 is a somewhat sculpted, plate-like body comprising a reverse side 102 and a distal edge 104. Inclined downwardly from the center of the distal edge 104 away from the reverse side 102 is a lift arm 94 comprising a first arm piece 96 and a second arm piece 98 in parallel, spaced-apart juxtaposition. Each arm piece 96, 98 comprises a thin, elongated, plate-like body having at its free end an inwardly-extending, cylindrical projection 100 orthogonal thereto.

Figure 8:
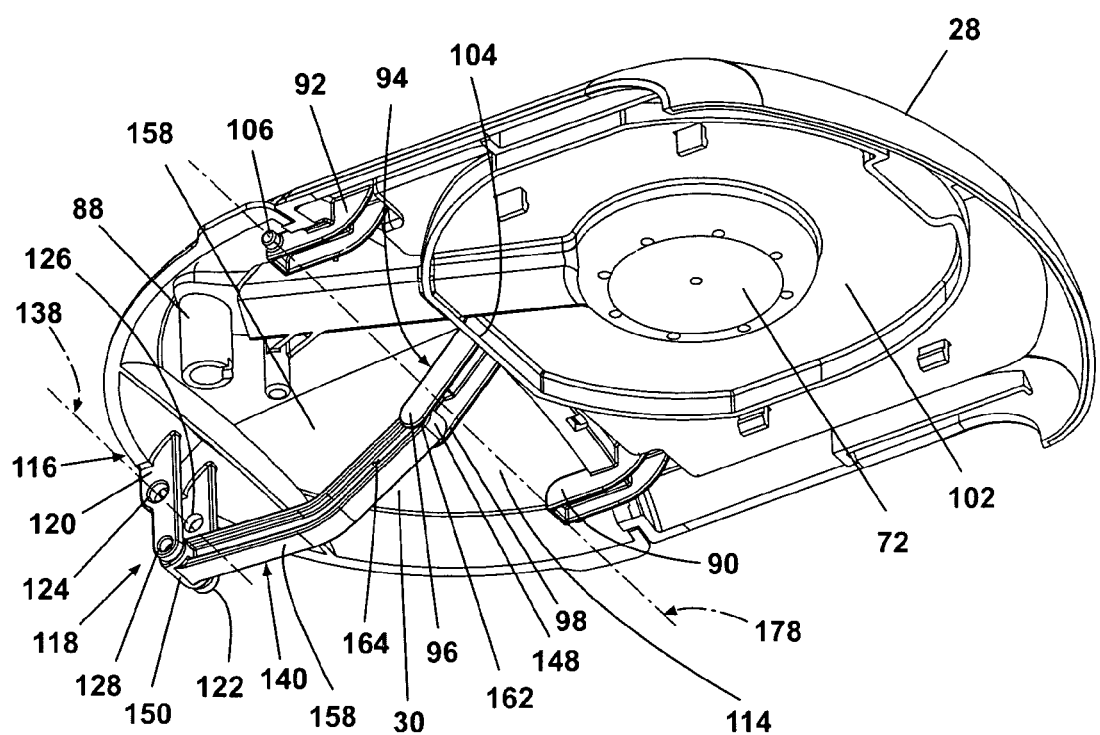
FIG. 8 is a close-up perspective view from below of the cover assembly illustrated in FIG. 1.

Extending also from each end of the distal edge 104 generally coplanar with the inner cap 82 is a pair of hinges 90, 92. As shown in FIG. 8, each hinge 90, 92 is provided at its free end with an outwardly-extending, cylindrical projection 106 orthogonal thereto and defining a pivot axis 178 (FIG. 8). With the top cap 80, the inner cap 82, the bottom cap 84, and the showerhead plate 86 assembled into the front cover 28, a connector 88 can be attached to the shower assembly 70 to fluidly interconnect the shower assembly 70 with the heated water supply.

The rear cover 30 is illustrated as a two-piece assembly comprising a top cap 110 and a bottom cap 112 in stacked, interconnected register. Alternatively, the rear cover 30 can comprise a single cover piece, or another configuration, consistent with the inventive concepts described herein. The bottom cap 112 is a somewhat sculpted, D-shaped, plate-like body comprising a reverse side 114, a distal portion 116, and a proximal edge 132. Inclined downwardly from the center of the distal portion 116 away from the reverse side 114 is a pivot arm 118 comprising a first arm piece 120 and a second arm piece 122 in parallel, spaced-apart juxtaposition. Each arm piece 120, 122 comprises a thin, elongated, plate-like body having at its free end a pair of coaxially aligned linkage pin apertures 128, 130, and at an intermediate portion a pair of coaxially aligned hinge pin apertures 124, 126 defining a pivot axis 138 (FIG. 8).

Figure 7A:
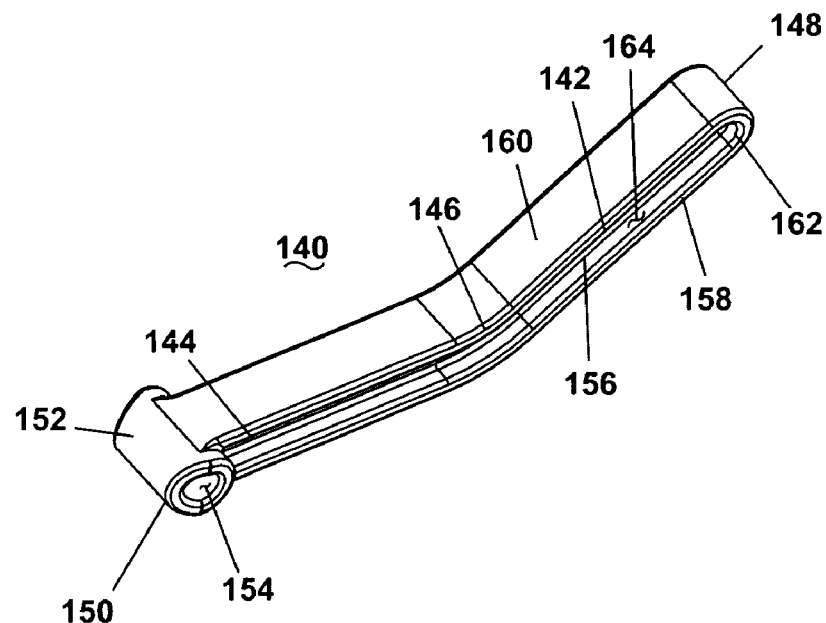
FIG. 7A is an enlarged perspective view of a linkage arm comprising a portion of the linkage assembly illustrated in FIG. 4.
Figure 7B:
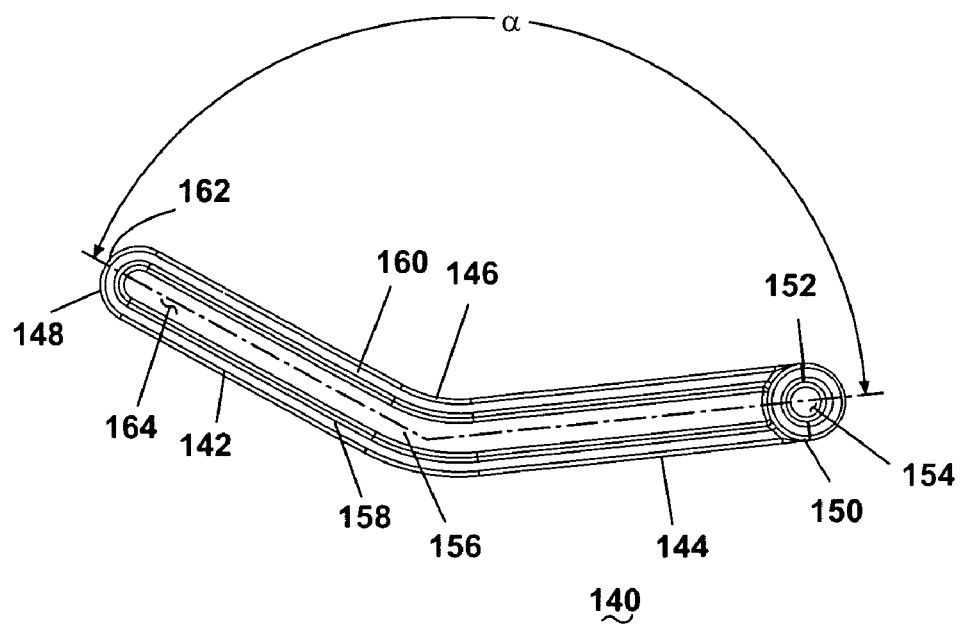
FIG. 7B is an enlarged elevational view of the linkage arm illustrated in FIG. 7A.

Referring to FIGS. 7A–B, a linkage arm 140 is an elongated, generally I-beam shaped member comprising a translating portion 142 and a pivoting portion 144 connected by a bend 146. The translating portion 142 terminates in a proximal end 148. The pivoting portion 144 terminates in a distal end 150 comprising a cylindrical pivot bearing 152 having a pivot pin aperture 154 extending coaxially therethrough orthogonal to the longitudinal axis of the pivoting portion 144. The linkage arm 140 further comprises an upper flange 158 and a lower flange 160 in generally parallel, spaced-apart juxtaposition, joined by a web 156 to define the I-beam shape of the linkage arm 140 and a pair of opposed channels 164, 166 extending the length of the linkage arm 140. The upper and lower flanges 158, 160 transition at the proximal end 148 in an arcuate flange 162 joining the upper and lower flanges 158, 160. In the embodiment of the linkage arm 140 illustrated in FIG. 7B, the angle ax defined by the translating portion 142 and the pivoting portion 144 is approximately 144°.

The linkage arm 140 is operably interconnected with the front cover 28 and the rear cover 30 as follows. Referring again to the Figures and in particular to FIGS. 4 and 8, the proximal end 148 is attached to the lift arm 94 so that the projections 100 on the arm pieces 96, 98 are slidably received within the channels 164, 166. It will be recognized that the spacing of the arm pieces 96, 98 is adapted to accommodate the linkage arm 140 therebetween to enable the linkage arm 140 to slidably translate relative to the arm pieces 96, 98 with the projections 100 extending into the channels 164, 166.

The distal end 150 is pivotally attached to the pivot arm 118 by aligning the pivot pin aperture 154 with the linkage pin apertures 128, 130 and inserting a pivot pin (not shown) therethrough to enable the linkage arm 140 to pivot relative to the pivot arm 118. Alternatively, the arm pieces 120, 122 can be provided with projections (not shown) corresponding positionally to the linkage pin apertures 128, 130 and adapted for pivotable insertion into the pivot pin aperture 154 to provide a pivoting connection between the linkage arm 140 and the pivot arm 118. It will be recognized that the spacing of the arm pieces 120, 122 is adapted to accommodate the pivot bearing 152 therebetween to enable the linkage arm 140 to pivot relative to the arm pieces 120, 122.

Figure 9:
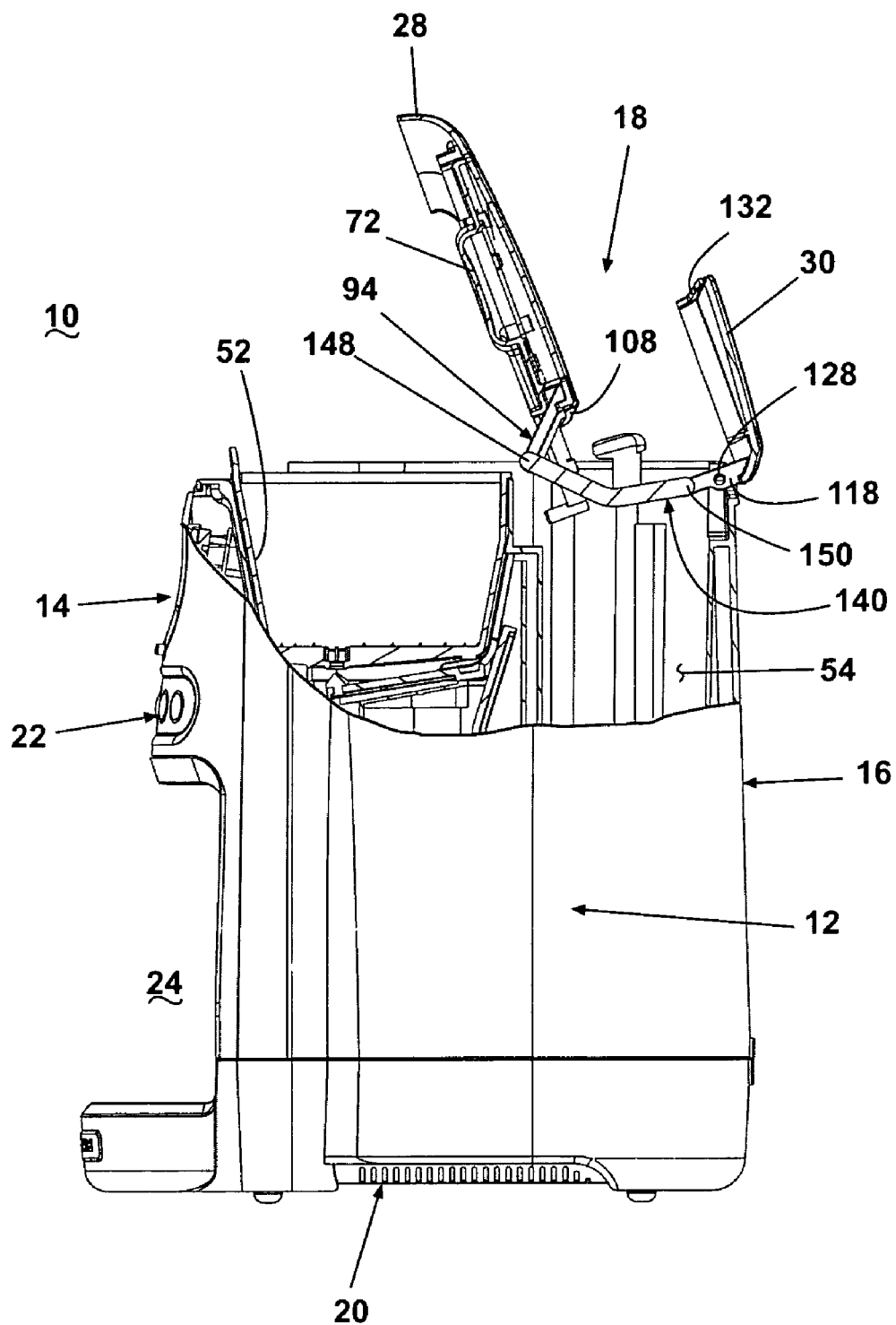
FIG. 9 is an elevational view of the top-loading automatic drip coffeemaker illustrated in FIG. 3 with the upper portion illustrated as a sectional view taken along line 9—9.

The linkage arm 140 is connected to the front cover 28 and the rear cover 30 as described above so that the pivoting portion 144 slopes downwardly relative to the translating portion 142, as shown in FIG. 9. The front cover 28 is pivotally attached to the housing 12 by inserting the hinge posts 106 into suitable bearings 180 (FIG. 4) so that the front cover 28 can pivot about the pivot axis 178. Similarly, the rear cover 30 is pivotally attached to the housing 12 by a pivot pin (not shown) inserted through the hinge pin apertures 124, 126 and a suitable bearing 182 in the housing 12 (FIG. 4) so that the rear cover 30 can pivot about the pivot axis 138. Alternatively, the housing 12 can be provided with a bearing having projections (not shown a) adapted for pivotable insertion into the hinge pin apertures 124, 126 to provide a pivoting connection between the pivot arm 118 and the housing 12.

Figure 5:
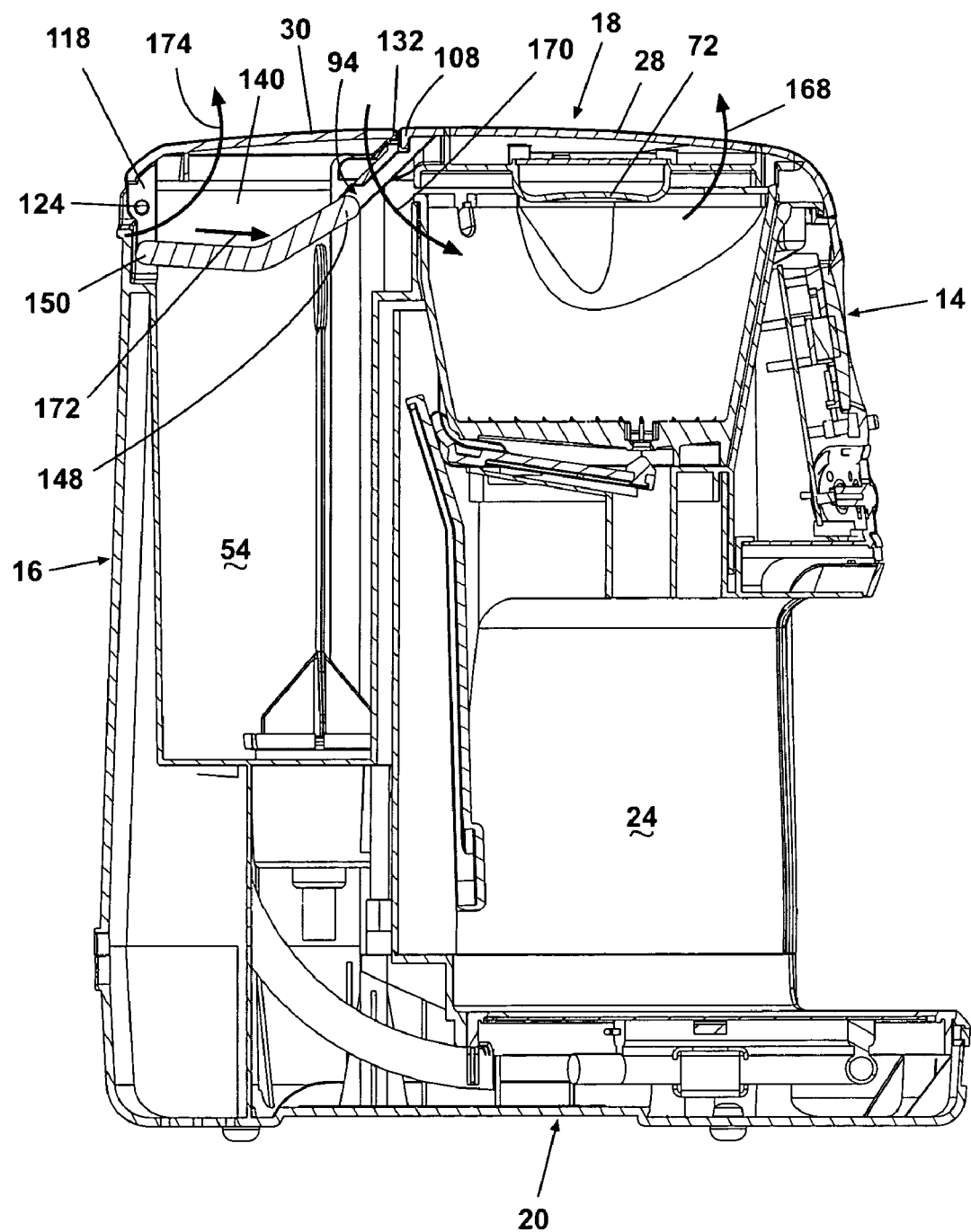
FIG. 5 is a sectional view of the top-loading automatic drip coffeemaker illustrated in FIG. 1 taken along line 5—5.

As so connected, the linkage arm 140 will be pivotally connected to the rear cover 30 and slidably connected to the front cover 28. Referring to FIGS. 5, 8, and 9, with the covers 28, 30 in a closed position, the linkage arm 140 will be pivotally suspended from the pivot arm 118 and slidably suspended from the lift arm 94 with the projections 100 at the proximal end 148 against or adjacent to the arcuate flange 162. Opening of the front cover 28, as shown by the front cover lift vector 168 (FIG. 5), will urge the lift arm 94 in a downward and forward direction, as shown by the front cover pivot vector 170 (FIG. 5). The projections 100 will bear against the arcuate flange 162, thereby urging the proximal end 148 in a downward and forward direction, as shown by the linkage translation vector 172 (FIG. 5). This will urge the distal end 150 in a forward direction, thereby urging the pivot arm 118 to pivot about the pivot axis 138, as shown by the rear cover pivot vector 174 (FIG. 5), and pivoting the rear cover 30 to an open position (FIG. 9). The pivot connection between the pivot bearing 152 and the pivot arm 118 will enable the linkage arm 140 to pivot as necessary in response to the combined translational and rotational movement of the linkage arm 140 during the cover opening process.

The linkage arm 140 also enables the rear cover 30 to be opened without opening the front cover 28. As the rear cover 30 is opened, the linkage arm 140 will be translated toward the front of the coffeemaker by the rotational movement of the pivot arm 118. However, the proximal end 148 will translate relative to the lift arm 94 as the projections 100 slide within the channels 164, 166, so that no movement of the front cover 28 is initiated. After the rear cover 30 is opened, the front cover 28 can be opened without restriction from the linkage arm 140 or the opening of the rear cover 30.

The top-loading automatic drip coffeemaker described herein comprises a convenient water inlet at the front of the coffeemaker connected through a conduit to a reservoir at the rear of the coffeemaker in combination with a top load filter basket which results in a compact configuration. The reservoir can be directly accessed by a rear cover which can be opened to introduce water directly into the reservoir. A front cover covers the filter basket at the front of the top-loading automatic drip coffeemaker, which can be opened to provide access to the filter basket and the water inlet from which water can flow through the conduit to the reservoir, eliminating the need for reaching to the rear of the coffeemaker to fill the reservoir. The front cover is interconnected with the rear cover through a linkage assembly, which opens the rear cover when the front cover is opened, but enables the rear cover to be opened alone. The top-loading automatic drip coffeemaker can be located beneath typical kitchen cabinetry and both covers can be opened because of the reduced clearance required by the coffeemaker and the cover configuration. The water inlet at the front of the top-loading automatic drip coffeemaker eliminates the necessity of moving the coffeemaker from beneath the cabinetry in order to fill the reservoir.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A top-loading coffeemaker for brewing a coffee beverage from ground coffee, comprising:
    a housing having a rear portion and a front portion;
    a water reservoir located in the rear portion for storing water for brewing the coffee beverage;
    a filter basket located in the front portion for containing the ground coffee during brewing;
    a rear cover moveably mounted to the housing for movement between a closed position, where the rear cover overlies the water reservoir, and an open position, where the rear cover is away from the water reservoir to permit access thereto;
    a front cover moveably mounted to the housing for movement between a closed position, where the front cover overlies the filter basket, and an open position, where the front cover is away from the filter basket to permit the insertion and removal of a filter into and from the filter basket; and
    a linkage connecting the front and rear covers such that the rear cover is moved from the closed to the open position in response to the movement of the front cover from the closed to the open position.

2. The top-loading coffeemaker according to claim 1, wherein the linkage connects the front and rear covers such that the rear cover can be moved from the closed to the open position independent of the movement of the front cover.

3. The top-loading coffeemaker according to claim 2, wherein the linkage comprises a linkage arm pivotally attached to the rear cover and translatable toward the front cover when the rear cover is moved from the closed position to the open position.

4. The top-loading coffeemaker according to claim 2, wherein the linkage comprises a linkage arm slidably attached to the front cover and moveable independently of the front cover.

5. The top-loading coffeemaker according to claim 1, and further comprising a conduit extending between the front and rear portions, with an inlet located in the front portion and an outlet fluidly connected to the water reservoir, such that the water reservoir can be filled by introducing water into the inlet.

6. The top-loading coffeemaker according to claim 5, wherein a portion of the conduit is located in front of the filter basket.

7. The top-loading coffeemaker according to claim 6, wherein a portion of the conduit extends beside the filter basket.

8. The top-loading coffeemaker according to claim 7, wherein at least a portion of the inlet is located in front of the filter basket.

9. The top-loading coffeemaker according to claim 8, wherein the conduit is an open top channel.

10. A top-loading coffeemaker for brewing a coffee beverage from ground coffee, comprising:
    a housing defining an open top and having a rear portion and a front portion accessible through the open top;
    a water reservoir located in the rear portion for storing water for brewing the coffee beverage, and covered by a rear cover;
    a filter basket located in the front portion for containing the ground coffee during brewing;
    a conduit extending between the front and rear portions, with an inlet located in the front portion and an outlet fluidly connected to the water reservoir, such that the water reservoir can be filled by introducing water into the inlet;
    a front cover for covering only the front portion of the housing to overlie the filter basket and the inlet and pivotally mounted to the housing for movement between a closed position, and an open position to permit the insertion and removal of a filter into and from the filter basket through the open top and the introduction of water through the open top into the inlet and into the reservoir through the conduit; and
    a linkage connecting the front and rear covers such that the rear cover is moved from the closed to the open position in response to the movement of the front cover from the closed to the open position.

11. The top-loading coffeemaker according to claim 10, wherein a portion of the conduit extends beside the filter basket.

12. The top-loading coffeemaker according to claim 11, wherein at least a portion of the inlet is located in front of the filter basket.

13. The top-loading coffeemaker according to claim 12, wherein the conduit is an open top channel.

14. The top-loading coffeemaker according to claim 10, and further comprising a rear cover moveably mounted to the housing for movement between a closed position, where the rear cover overlies the water reservoir, and an open position, where the rear cover is away from the water reservoir to permit access thereto.

15. The top-loading coffeemaker according to claim 10, wherein the linkage connects the front and rear covers such that the rear cover can be moved from the closed to the open position independent of the movement of the front cover.

16. The top-loading coffeemaker according to claim 10, wherein the linkage comprises a linkage arm pivotally attached to the rear cover and translatable toward the front cover when the rear cover is moved from the closed position to the open position.

17. The top-loading coffeemaker according to claim 10, wherein the linkage comprises a linkage arm slidably attached to the front cover and moveable independently of the front cover.

18. The top-loading coffeemaker according to claim 10, wherein the linkage connects the front and rear covers such that the rear cover automatically moves to the closed position when the front cover is moved to the closed position.

19. The top-loading coffeemaker according to claim 18, wherein the automatic closing is accomplished through gravity.

20. The top-loading coffeemaker according to claim 10, and further comprising a base located beneath the front portion for supporting a container containing the coffee beverage.

21. A top-loading coffeemaker for brewing a coffee beverage from ground coffee, comprising:
  a housing comprising a rear portion, with an open top, and a front portion with an open top;
  a front cover mounted to the housing for movement between a closed position, where the front cover overlies the open top of the front portion, and an open position, where the front cover is away from the open top of the front portion, and further comprising a front lever arm;
  a rear cover moveably mounted to the housing for movement between a closed position, where the rear cover overlies the open top of the rear portion, and an open position, where the rear cover is away from the open top of the rear portion, and further comprising a rear lever arm;
  a linkage comprising a link arm having one end rotatably coupled with the rear cover, another end slidably coupled with the front lever arm, and a catch extending from the link arm, such that the rear cover can be moved from the closed to the open position independent of the movement of the front cover;
  wherein when the front cover is pivoted from the closed to the open position, the catch contacts a portion of the front cover to move the rear cover to the open position.

22. The top-loading coffeemaker according to claim 21, wherein the linkage connects the front and rear covers such that the rear cover automatically moves to the closed position when the front cover is moved to the closed position.

23. The top-loading coffeemaker according to claim 22, wherein the automatic closing is accomplished through gravity.

24. The top-loading coffeemaker according to claim 21 wherein, when the front cover is pivoted from the closed to the open position, the catch slides into contact with the front lever arm to move the rear cover to the open position, and when the rear cover is pivoted from the closed to the open position, the catch slides away from the front lever arm to leave the front cover in the closed position.

* * * * *